United States Patent [19]

Hainneville

[11] Patent Number: 5,351,410
[45] Date of Patent: Oct. 4, 1994

[54] INSPECTION DEVICE FOR INSPECTING THE DIMENSIONS OF AN OBJECT

[75] Inventor: Lucien Hainneville, Bayeux, France

[73] Assignee: Societe Industrielle De Liaisons Electriques-Silec, Paris, France

[21] Appl. No.: 185

[22] Filed: Jan. 4, 1993

[30] Foreign Application Priority Data

Jan. 6, 1992 [FR] France ............................... 92 00036

[51] Int. Cl.⁵ .............................................. G01B 5/08
[52] U.S. Cl. ..................................... 33/542; 33/555.2; 33/783; 33/550; 33/555.1
[58] Field of Search ................. 33/555.2, 555.3, 555.1, 33/542, 542.1, 543, 550, 551, 557, 568, 783

[56] References Cited

U.S. PATENT DOCUMENTS

| | | | |
|---|---|---|---|
| 4,447,960 | 5/1984 | Golinelli et al. | 33/783 X |
| 4,559,717 | 12/1985 | Scire et al. | 35/568 |
| 4,625,413 | 12/1986 | Possati et al. | 33/551 X |
| 4,881,324 | 11/1989 | Khinchuk | 33/555.1 |

FOREIGN PATENT DOCUMENTS 0181460 5/1986 European Pat. Off. .
0292767 11/1988 European Pat. Off. .

*Primary Examiner*—William A. Cuchlinski, Jr.
*Assistant Examiner*—Alvin Wirthlin
*Attorney, Agent, or Firm*—Griffin, Butler, Whisenhunt & Kurtossy

[57] ABSTRACT

The invention relates to an inspection device for inspecting the dimensions of an object, the device being of the type comprising a support-forming portion together with an elastically deformable system having two measurement arms and an element connected to the arms in such a manner as to be displaced in an axial direction for co-operating with an associated displacement sensor. According to the invention, the deformable system is in the form of a one-piece element that is generally W-shaped, with two hinged measurement arms connected together by two link arms, together with an axially movable central arm; the one-piece element is essentially flat, and it deforms in its own plane when contactors provided at the ends of the hinged measurement arms are moved apart or towards each other. The device is particularly applicable to inspecting inside or outside diameters of mechanical workpieces.

11 Claims, 2 Drawing Sheets

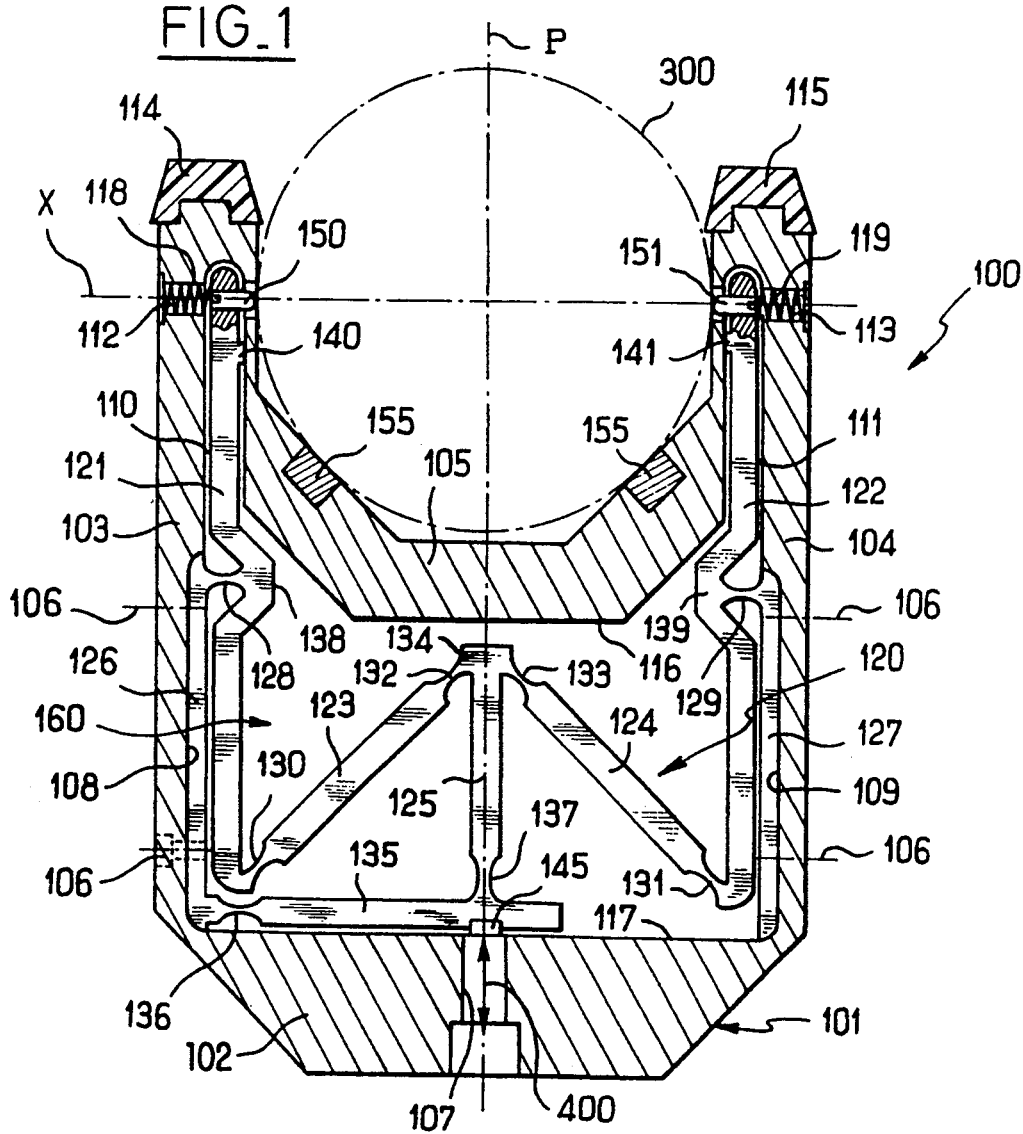
FIG_1
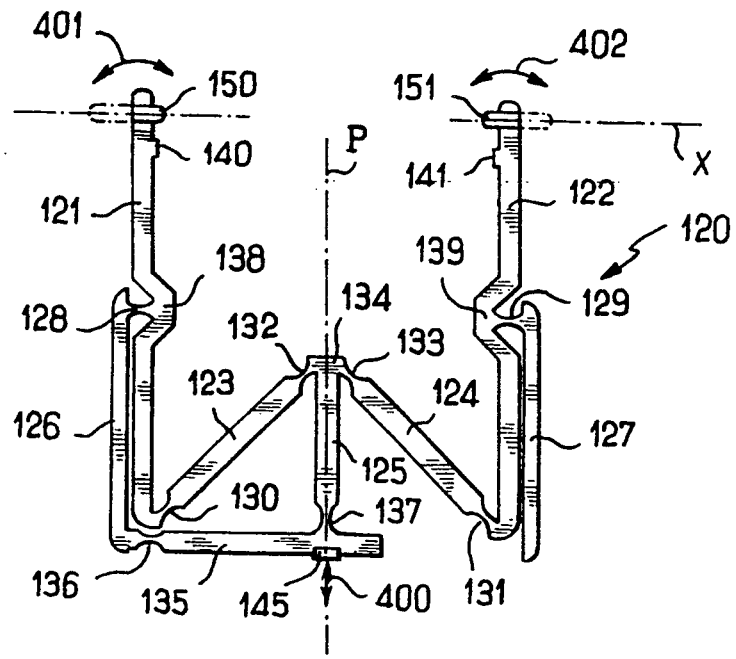
FIG_2

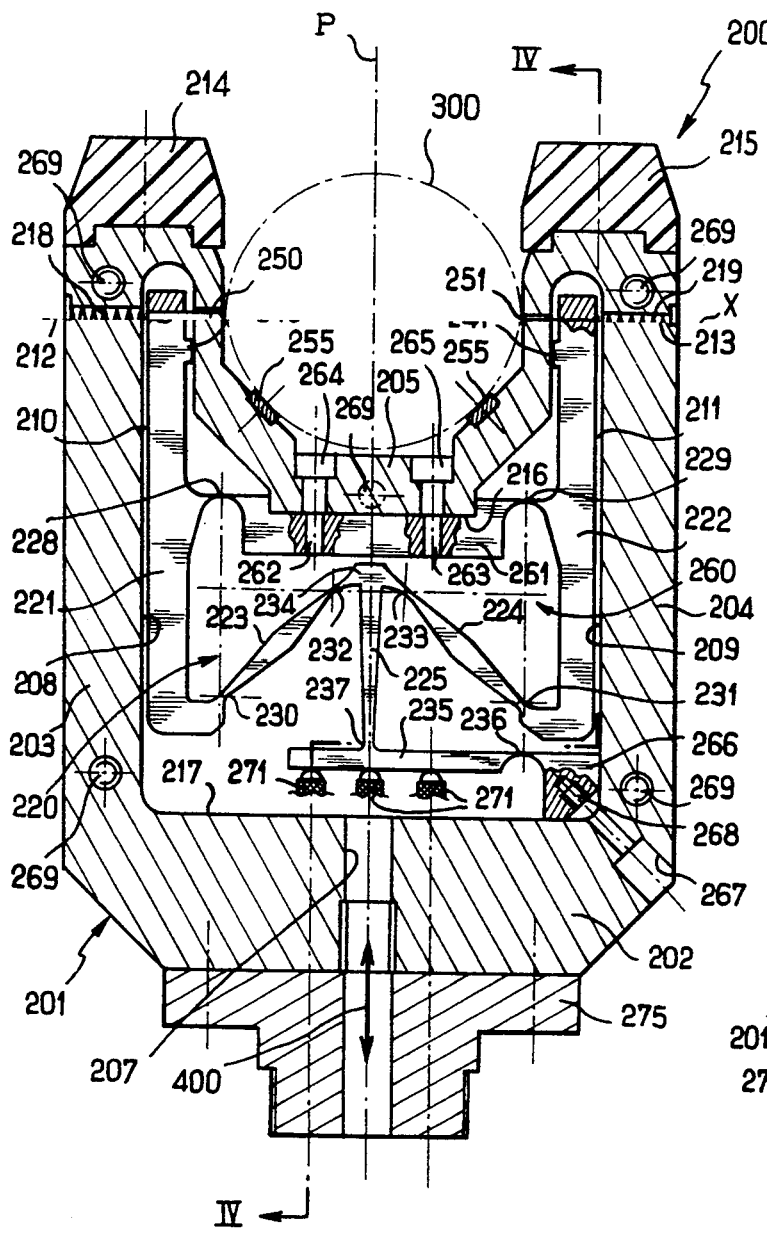
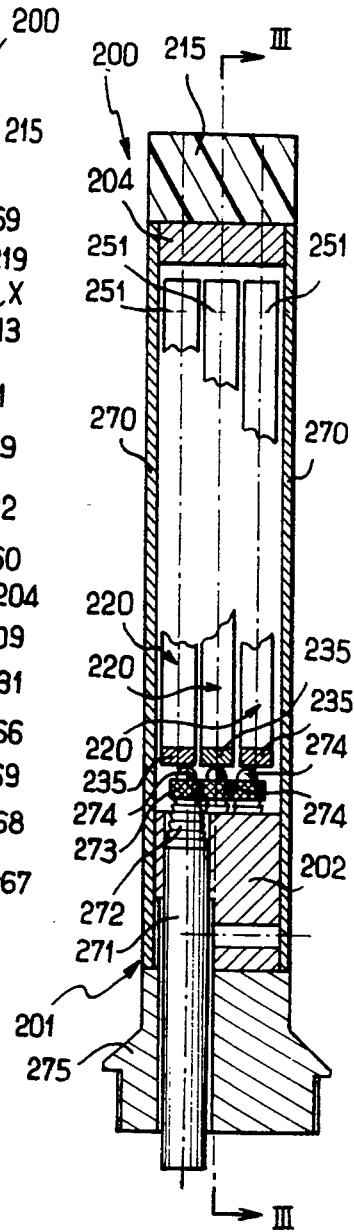
FIG. 3
FIG. 4

INSPECTION DEVICE FOR INSPECTING THE DIMENSIONS OF AN OBJECT

The present invention relates to checking the dimensions of an object, in particular the outside or inside diameters of mechanical parts, and it relates more particularly to an inspection device of the type comprising a support-forming portion together with a resiliently-deformable system mounted on the support and including firstly a pair of measuring arms having respective contactors at the free ends thereof for coming into contact with the part to be inspected, and secondly an element connected to said measurement arms in such a manner as to move in an axial direction essentially perpendicular to the axis of the contactors as a function of the mutual separation between said contactors, and to co-operate with an associated displacement sensor.

BACKGROUND OF THE INVENTION

An inspection device of that type is illustrated, for example in Document FR-A-2 443 047.

That inspection device thus includes two parallel measurement arms of semi-cylindrical section that project from a common base: the arms can move apart from each other by bending so as to inspect bores by means of the associated contactors. Such a device is therefore unsuitable for inspecting outside diameters. In addition, the deformable system uses a V-shaped spring blade that co-operates via a metal wire with a differential transducer: the device is thus necessarily bulky, and its accuracy remains limited by the great length of wire used for transmitting motion.

An analogous device is described in document U.S. application Ser. No. 4,881,324: the corresponding deformable one-piece unit includes two resilient bridges for directly connecting the support of the axially movable transducer to the two measurement arms, and four resilient bridges forming a hinged parallelogram.

Other inspection devices have also been proposed that make use of a U-shaped deformable unit. Thus, document EP-A-0 181 460 describes a device having two independent U-shaped units, each unit having three measurement arms hinged on a common base: a separation sensor is then associated with each pair of arms, and this is done for each unit, with measurement being performed by comparing corresponding signals. Other variants, likewise based on the principle of a deformable U-shape, with a differential transducer mounted between the branches thereof, are also described in document EP-A-0 292 767.

Finally, the state of the art is illustrated by documents U.S. application Ser. No. 3,958,337 and U.S. application Ser. No. 3,958,338 which describe analog gauges specially designed for inspecting small-diameter bores. Such gauges nevertheless constitute a structure that is complex and expensive to manufacture.

An object of the invention is to provide an inspection device that avoids the above-mentioned drawbacks and/or limitations.

Another object of the invention is to design a device whose structure makes it possible both to inspect bores and to inspect outside diameters, while nevertheless providing high accuracy in both cases.

A further object of the invention is to provide an inspection device which is both compact and easy to install.

SUMMARY OF THE INVENTION

More particularly, the present invention provides an inspection device for inspecting the dimensions of an object, in particular inside or outside diameters of workpieces, the device being of the type comprising a support-forming portion together with a deformable system resiliently mounted on the support and comprising firstly two measurement arms having free ends provided with respective contactors intended to come into contact with the piece to be inspected, and secondly an element connected to said measurement arms so as to be displaced in an axial direction essentially perpendicular to the axis of the contactors as a function of the distance between said contactors, and to co-operate with an associated displacement sensor, wherein the deformable system is in the form of a one-piece element that is generally W-shaped, having two measurement arms hinged relative to the support-forming portion and connected together by two link arms associated with an axially movable central arm connected to the junction between said link arms, said one-piece element being essentially flat and deforming within its own plane when the contactors provided at the ends of its hinged measurement arms move away from each other or towards each other.

In a first variant, the two measurement arms are essentially parallel in a neutral position, and each of them is hinged on an associated fixing arm which serves to fix the deformable one-piece element to the support-forming portion.

It is then advantageous for each measurement arm to be connected by a resilient bridge to the associated fixing arm: such an embodiment considerably simplifies the structure of the device and therefore facilitates assembly thereof.

It is also advantageous for each measurement arm to have a kink level with its resilient bridge so as to enable it to lie adjacent to the associated fixing arm: this makes it possible to implement a deformable one-piece unit that is particularly compact.

Also preferably, the free end of the central arm is hinged to a coupling arm which is itself hinged to one of the fixing arms, and which carries means for co-operating with an associated displacement sensor. In particular, when in the neutral position, the coupling arm extends substantially perpendicularly to the associated fixing arm and to the central arm, being connected to said arms via resilient bridges.

The presence of such a connection arm is particularly advantageous insofar as the connection arm avoids the need to provide guidance for the central arm using the support-forming part, thereby considerably simplifying implementation of the device.

In a second variant, the two measurement arms are essentially rectilinear and parallel, and are hinged to the two ends of a common coupling branch which is substantially perpendicular thereto, and which serves to fix the one-piece element to the support-forming portion.

It is then preferable for each measurement arm to be connected via a resilient bridge to the common coupling and fixing branch.

Also advantageously, the free end of the central arm is hinged on a coupling arm which is itself hinged to a retaining wedge fixed to the support-forming portion; in particular, when in the neutral position, the coupling arm extends substantially perpendicularly to the central arm, being connected to said arm and to the retaining wedge by associated resilient bridges.

Also advantageously, in both of the above-specified variants, each of the link arms is connected to the central arm by an associated resilient bridge.

The various above-mentioned resilient bridges are most advantageous since they make it possible to implement a deformable unit that is genuinely a single piece, without any return springs or hinge or connection pivots being present.

Also preferably, the support-forming portion is essentially flat, having a central space in which the deformable one-piece element is received. In particular, the support-forming portion is in the form of a plate-shaped housing, said housing having two branches in which the free ends of the measurement arms are received, the associated contactors projecting from said branches.

Such a housing is extremely compact and convenient to use, and by making it flat, it is possible to use a plurality of identical devices simultaneously, the devices being distributed along the mechanical part to be inspected.

It is then advantageous for the central space of the support-forming portion to have two parallel transverse edges, at least one of which constitutes an abutment limiting the movement of the central arm when the contactors move apart from each other or towards each other.

Also preferably, the measurement arms, the link arms, and the central arm of the one-piece element together have a plane of symmetry constituted by the median plane of the support-forming portion, regardless of the deformation of the one-piece element. The device is thus always in equilibrium, thereby guaranteeing that its neutral rest position is constant and reliable.

Finally, it is advantageous for the deformable one-piece element together with any optional additional arms thereof to be an element made of metal and obtained from a plate having a thickness of a few millimeters, e.g. by electro-erosion. The electro-erosion manufacturing method is particularly advantageous in the present context because of the accuracy required, in particular for making the resilient bridges (in a variant it is possible to use a cutting technique based on a laser or a high pressure water jet).

In a particular embodiment, the inspection device includes a plurality of deformable one-piece elements stacked successively in a common support-forming portion. Such a device then makes it possible to inspect a plurality of close together bearing surfaces simultaneously using a single apparatus.

BRIEF DESCRIPTION OF THE DRAWINGS

Embodiments of the invention are described by way of example with reference to the accompanying drawings, in which:

FIG. 1 is a view showing an inspection device of the invention (the housing of the device is shown in section in order to distinguish more clearly the deformable one-piece element), in this case for inspecting an outside diameter;

FIG. 2 is a plan view of the deformable one-piece element of the above device (with the opposite position for the contactors as shown in chain-dotted lines recalling that the device can also be used for inspecting bores);

FIG. 3 is a view analogous to FIG. 1, showing a variant embodiment of the inspection device; and FIG. 4 is a section on IV—IV of FIG. 3 (where FIG. 3 is a section on III—III of FIG. 4), showing more clearly how the plurality (in this case three) identical deformable one-piece elements are successively disposed in the common housing, and also showing the associated displacement sensors.

DETAILED DESCRIPTION

FIG. 1 shows an inspection device 100 of the invention, which device is applied in this case to inspecting the outside diameter of a cylindrical object 300, e.g. a bearing surface of a crank shaft, it being understood that such dimensional inspection could be applied to other types of objects, and in particular to the bores of mechanical workpieces.

The inspection device 100 comprises a support-forming portion 101 and an elastically-deformable system 120 mounted in the support.

According to an essential characteristic of the invention, the elastically deformable system is in the form of a one-piece element 120 which is generally W-shaped, having two measurement arms 121 and 122 that are hinged relative to the support-forming portion 101 and that are connected together by two link arms 123 and 124 together with an axially-movable central arm 125 connected to the junction between said link arms. The one-piece element 120 is essentially flat such that it deforms in its own plane when contactors 150 and 151 provided at the free ends of the hinged measurement arms 121 and 122 move away from or towards each other. Thus, when the two contactors 150 and 151 move away from or towards each other, the two hinged measurement arms 121 and 122 are caused to pivot about their pivots, thereby giving rise to axial movement in a direction that is essentially perpendicular to the axis X of the contactors (respectively upwards or downwards in FIG. 1) of the central arm 125, as represented diagrammatically by arrow 400, thereby enabling it to co-operate with an associated displacement sensor (not shown) which may be disposed in an associated housing 107 of the support-forming portion 101.

It should be observed that the deformable one-piece element 120 shown in FIGS. 1 and 2 is more elaborate than an element that is merely W-shaped plus an axially movable central arm. If the device were simplified to that extent, the axially moving central arm 125 would then co-operate directly with the associated displacement sensor, whereas in the present case, it co-operates therewith indirectly insofar as the one-piece element 120 shown in the drawings includes an additional coupling arm 135.

When in the neutral position, the two measuring arms 121 and 122 are essentially parallel in this case, thus making it possible for them to move angularly in one direction or the other so as to cause the end contactors 150 and 151 to move apart or towards each other, as represented diagrammatically in FIG. 2 by arrows 401 and 402. In practice, the maximum stroke of the contactors along their axis X is relatively small, e.g. less than about 100 micrometers. The measurement arms 121 and 122 could be hinged directly onto the support-forming portion 101, but for reasons of convenience in assembly and in order to simplify the structure, each of the two measurement arms 121 and 122 is hinged in this example on an associated fixing arm 126 or 127 which also serves to fix the deformable one-piece element 120 to the support-forming portion 101, with such fixing being provided, for example, by means of screws 106.

The support-forming portion 101 is essentially flat, having a central space 160 in which the deformable one-piece element 120 is received. More precisely, the support-forming portion 101 is in the form of a plate-shaped housing, said housing including a base 102 from which there project two branches 103 and 104. The free ends of the measurement arms 121 and 122 pass along associated channels 110 and 111 extending the central space 160. By making the support-forming portion 101 in this way, it is possible to achieve an embodiment that is extremely compact, thereby considerably facilitating use of the inspection device. Furthermore, the flat structure makes it possible for a plurality of identical inspection devices to be used simultaneously, said devices being spaced apart along a mechanical part to be inspected. Such multiple inspection is not possible with prior art devices, in particular because of their bulk.

The support-forming portion 101 is referred to below as the "housing".

As mentioned above, each of the measurement arms 121 and 122 is hinged on an associated fixing arm 126 or 127 which serves to fix the deformable one-piece element 120 to the housing 101. Resilient return means may be provided tending to urge each of the measurement arms 121 and 122 into the neutral position. The embodiment shown herein corresponds to a structure which is both simple and compact. Each measurement arm 121 or 122 is connected by a resilient bridge 128 or 129 to the associated fixing arm, with each of these resilient bridges forming the corresponding hinge.

In order to limit the lateral extent of the inspection device 100, provision is also made firstly for an elongate notch 108 and 109 in each of the branches 103 and 104 of the housing 101, which notches serve to receive the associated fixing arms 126 and 127 of the deformable one-piece element 120. In addition, each measurement arm 121 or 122 has a kink 138 or 139 receiving its resilient hinge bridge 128 or 129, so as to enable each measurement arm to lie adjacent to its associated fixing arm 126 or 127. In this case, the resilient bridges 128 and 129 are disposed substantially in the middle of each of the hinged measurement arms 121 and 122, but this is merely an advantageous example and is not essential.

The branches 103 and 104 of the housing 101 are connected to a central portion 105 of the housing, which central portion is cradle-shaped to receive the workpiece 300 to be inspected, with it being possible to position said workpiece in the cradle even more accurately because of two hard bearing surfaces 155 formed in the bottom of the cradle, said bearing surfaces being disposed symmetrically so that it is sure that inspection is performed on a diameter of the workpiece and not on a chord. In the vicinity of their free ends, the branches 103 and 104 have respective recesses 112 and 113 for receiving optional springs 118 and 119 associated with the contactors 150 and 151 to guarantee that the end balls of said contactors are applied with constant pressure. It should be observed that the two contactors 150 and 151 are, in this case, screwed into associated tapped holes in the ends of the measurement arms, being located on a common axis X which is perpendicular to the median plane P of the housing 101 of the inspection device.

The contactors 150 and 151 project from the branches 103 and 104 of the housing 101, and in this case they project inwards since the device shown is applicable to the particular case of inspecting the outside diameter of a cylindrical workpiece 300. It will readily be understood that the contactors 150 and 151 can easily be disposed in the opposite direction, while still lying on the axis X, so that inspections can be performed in the bores of workpieces (with such reversed position contactors being shown in chain-dotted lines in FIG. 2). FIG. 1 also shows two pads 114 and 115 made of plastic (e.g. nylon) or of soft metal (e.g. aluminum or brass) which serve both to protect the housing and to provide guidance by having sloping facing surfaces.

As mentioned above, the one-piece element 101 includes two hinged measurement arms 121 and 122 connected together by two link arms 123 and 124, together with an axially movable central arm 125 that is connected to the junction between the link arms. In the present example, the connections between adjacent arms are provided by resilient bridges analogous to the above-described resilient bridges 128 and 129 whereby the two measurement arms 121 and 122 are hinged. Thus, each of the link arms 123 and 124 is hinged at one of its ends to the associated measurement arm 121 or 122 via a resilient bridge 130 or 131. Similarly, the end 134 of the central arm 125 is connected to the opposite ends of the two link arms 123 and 124 via associated resilient bridges 132 and 133.

In this case, the central arm 125 is not implemented in the form of a plunger arm suitable for co-operating directly with an associated displacement sensor, in which case it would be necessary for the housing to provide guidance for such a central arm. Instead the free arm of the central arm 125 is hinged to a coupling arm 135 which is itself hinged to one of the fixing arms (in this case the arm 126), and it carries means 145 for co-operating with an associated displacement sensor (not shown), which means are here constituted by a single pellet. In this case, the coupling arm 135 extends substantially perpendicularly to the associated fixing arm 126 and to the central arm 135 when said deformable one-piece element is in its neutral position, and the coupling arm is connected to both above-mentioned arms 126 and 127 via respective resilient bridges 136 and 137 that constitute the corresponding hinges, which resilient hinges are preferably identical to the other resilient hinges described above. Thus, when the contactors 150 and 151 move apart or towards each other, the central arm 125 is caused to move axially upwards or downwards and consequently the coupling arm 135 is caused to tilt upwards or downwards abut its associated hinge 136. This tilting involves angles that are very small, such that the pellet 145 remains practically in the median plane P of the inspection device during upwards or downwards axial movement of the central arm 125.

Automatic guidance for the central arm 125 is thus provided both simply and effectively by the very structure of the deformable one-piece element 120.

The various resilient bridges mentioned above (there are eight of them in this case) are most advantageous insofar as they make it possible to implement a deformable unit that comprises a single piece without requiring any return springs or hinge or coupling pivots to be present. It will easily be understood that such a one-piece implementation of the deformable unit greatly facilitates installing said unit in the housing.

It is also possible to provide systems of abutments that limit the axial movement of the central arm 125 when the contactors 150 and 151 move apart or towards each other. In particular, the inside space 160 of the housing 101 may have two parallel transverse edges 116 and 117 that constitute abutments limiting the movement of the central arm 125, edge 116 co-operating with the end 134 of the arm 125 when it moves up (contactors moving apart), while edge 117 co-operates with the adjacent edge of the coupling arm 135 when the arm 125 moves down (contactors moving towards each other). Two projecting studs 140 and 141 can also be seen in the vicinity of the free ends of the hinged measurement arms 121 and 122, which pegs serve to limit the angular displacements of the measurement arms.

It should be observed that the measurement arms 121 and 122, the link arms 123 and 124, and the central arm 125 of the one-piece element 120 have the median plane P of the housing 101 as a plane of symmetry, and that this applies regardless of the deformation applied to said one-piece assembly. This ensures that the inspection device is always in equilibrium, thereby guaranteeing that the neutral, rest position of the device is constant and reliable.

To make the deformable one-piece element 120 shown in FIGS. 1 and 2, it is advantageous to use a technique such as electro-erosion. The deformable one-piece element is preferably a metal element made from a plate that is a few millimeters thick, e.g. 5 mm to 6 mm thick. The accuracy required, in particular for making the resilient bridges that simultaneously constitute hinges and return means, imposes very high manufacturing accuracy and this can easily be obtained by using an electro-erosion technique. In a variant, it is possible to use some machining other technique that provides high accuracy, such as laser cutting or cutting by means of a jet of water under high pressure.

The recess 107 provided in the base 102 of the housing 101 serves to receive a displacement sensor which may be of any known type, for example a linear variable-differential transformer (LVDT) or a capacitive sensor. Furthermore, FIG. 1 does not show the couplings for connecting measurement feelers to a central unit that processes the inspections performed. Such couplings and equipment are well known to the person skilled in the art and do not require any special description.

FIGS. 3 and 4 show another embodiment of the inspection device of the invention.

This variant includes numerous components that are identical or analogous to the those of the above-described device 100, such that these corresponding components are given the same references plus one-hundred.

The inspection device 200 includes a housing 201 which is designed to receive a plurality (in this case three) identical deformable one-piece units 220: this device can thus be used for simultaneously measuring three bearing surfaces that are axially offset from one another.

Like the preceding device, each one-piece element 220 comprises two measurement arms 221 and 222 connected together by two link arms 223 and 224 to form a W-shape associated with an axial displacement central arm 225 which, as before, is hinged to a coupling arm 235. However, the measurement arms 221 and 222 are essentially rectilinear and parallel in this case, and they are hinged to opposite ends of a common coupling branch 261 extending substantially perpendicular thereto, said branch 261 serving to fix the one-piece element 220 to the housing 201. The hinge links are preferably made by means of resilient bridges 228 and 229 analogous to the above-described resilient bridges. The one-piece assembly 220 is fixed in this case by being bolted to the central cradle-forming portion 205 of the housing 201 (tapped bores 262 and 263 can be seen in the branch 261, and stepped holes 264 and 265 can be seen in the cradle portion 205 for this purpose). Because the fixing arms are omitted, the coupling arm 235 is organized differently: as before, the arm 235 is hinged to one end of the central arm 225 by means of a resilient bridge 237, but in this case its other end is hinged to a retaining wedge 266 which is fixed to the housing 201 (a blind tapped hole 268 can be seen associated with a fixing screw that passes through a stepped hole 267 provided in the corresponding corner of the housing 201). The hinged connection to the retaining wedge 266 is provided in this case by a resilient bridge 236 analogous to the preceding bridge.

Each of the deformable one-piece units 220 has arms 223, 224, and 225 which are tapering in shape, for the purpose of keeping inertia as small as possible.

As can be seen more clearly in FIG. 4, the housing 201 is designed in this case to receive three identical one-piece units 220. To this end, the base 202 of the housing 201 includes three passages 207 for the associated displacement sensors, and these passages are offset so as to ensure that the device remains compact: FIG. 4 shows one 271 of these sensors, with its tip ball 274 welded to a knurled portion 273 which passes through a sealing bellows 272. Each of the three balls 274 is in contact with the associated coupling arm 235 so as to provide co-operation between the corresponding one-piece unit 220 and its sensor 271 (as represented by arrow 400). A bottom base 275 is fixed beneath the housing 201 and the sensors 271 pass through said bottom base, with the base having an outside thread to enable the device to be provided with a handle.

The three one-piece units 220 received in this way are also protected by two closure plates 270 fixed on either side of the housing 201 (five associated tapped holes 269 can be seen in FIG. 3).

A device is thus provided whose structure is equally suitable for inspecting outside diameters and bores, while providing high accuracy in both cases. The inspection device of the invention is both compact and easy to assemble.

The invention is not limited to the embodiments described above, but on the contrary it covers any variant that reproduces the essential characteristics specified above by equivalent means.

I claim:

1. An inspection device for inspecting the dimensions of an object, in particular inside or outside diameters of workpieces, the device comprising a portion which forms a support, a deformable system resiliently mounted on said support and having two measurement arms with free ends provided with respective contactors for contacting the workpiece to be inspected according to a common axis, wherein the deformable system is in the form of a one-piece element that is generally W-shaped, said one-piece element including the two measurement arms together with two link arms associated with an axially movable central arm connected by associated resilient bridges to a junction between said link arms, the said two measurement arms being essentially parallel in a neutral position, and each of the measurement arms being hinged on an associated fixing arm which serves to fix the one-piece element to the support, and said central arm being displaceable in an axial direction essentially perpendicular to the common axis of the contactors as a function of the distance between said contactors, and co-operating with an associated displacement sensor, said one-piece element being essentially flat and deforming within its own plane when the contactors provided at the ends of its hinged measurement arms move away from each other or towards each other.

2. An inspection device according to claim 1, wherein each measurement arm is connected by a resilient bridge to the associated fixing arm.

3. An inspection device according to claim 2, wherein each measurement arm has a kink level with its resilient bridge so as to enable it to lie adjacent to the associated fixing arm.

4. An inspection device according to claim 1, wherein the central arm has a first end at the junction between the two link arms, and a second end that is hinged to a coupling arm which is itself hinged to one of the fixing arms, and which carries means for co-operating with an associated displacement sensor.

5. An inspection device according to claim 4, wherein when in the neutral position, the coupling arm extends substantially perpendicularly to the associated fixing arm and to the central arm, being connected to said arms via resilient bridges.

6. An inspection device for inspecting the dimensions of an object, in particular inside or outside diameters of workpieces, the device comprising a portion which forms a support, a deformable system resiliently mounted on said support and having two measurement arms with free ends provided with respective contactors for contacting the workpiece to be inspected according to a common axis, wherein the deformable system is in the form of a one-piece element that is generally w-shaped, said one-piece element including the two measurement arms together with two link arms associated with an axially movable central arm connected by associated resilient bridges to a junction between said link arms, the said two measurement arms being essentially rectilinear and parallel, and being hinged by associated resilient bridges to the two ends of a common coupling branch which is substantially perpendicular thereto, and which serves to fix the one-piece element to the support, said central arm having a first end at the junction between the two link arms, and a second end that is hinged on a coupling arm which is itself hinged to a retaining wedge fixed to the support, said central arm being displaced in an axial direction essentially perpendicular to the common axis of the contactors as a function of the distance between said contactors, and co-operating with an associated displacement sensor, said one-piece element being essentially flat and deforming within its own plane when the contactors provided at the ends of its hinged measurement arms move away from each other or towards each other.

7. An inspection device according to claim 6, wherein, when in a neutral position, the coupling arm extends substantially perpendicularly to the central arm, being connected to said arm and to the retaining wedge by associated resilient bridges.

8. An inspection device according to claim 6, wherein the support is essentially flat, having a central space in which the deformable one-piece element is received.

9. An inspection device according to claim 8, wherein the support is in the form of a plate-shaped housing, said housing having two branches in which the free ends of the measurement arms are received, the associated contactors projecting from said branches.

10. An inspection device according to claim 9, wherein the central space of the support has two parallel transverse edges, at least one of which constitutes an abutment limiting the movement of the central arm when the contactors move apart from each other or towards each other.

11. An inspection device according to claim 6, including a plurality of deformable one-piece elements stacked successively in a common support.

* * * * *